United States Patent
Liang

(10) Patent No.: US 12,132,695 B2
(45) Date of Patent: Oct. 29, 2024

(54) MESSAGE SENDING METHOD AND TERMINAL

(71) Applicant: VIVO MOBILE COMMUNICATION CO., LTD., Guangdong (CN)

(72) Inventor: Youwen Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 123 days.

(21) Appl. No.: 17/538,799

(22) Filed: Nov. 30, 2021

(65) Prior Publication Data

US 2022/0086114 A1 Mar. 17, 2022

Related U.S. Application Data

(63) Continuation of application No. PCT/CN2020/092373, filed on May 26, 2020.

(30) Foreign Application Priority Data

May 30, 2019 (CN) .......................... 201910463299.7

(51) Int. Cl.
G06F 15/16 (2006.01)
G06F 3/04886 (2022.01)
(Continued)

(52) U.S. Cl.
CPC .......... *H04L 51/42* (2022.05); *G06F 3/04886* (2013.01); *H04W 4/12* (2013.01)

(58) Field of Classification Search
CPC ....... H04L 51/42; H04L 51/04; H04L 12/185; H04L 12/1886; G06F 3/04886; G06F 3/0482; G06F 3/0486; G06F 3/0488; G06F 3/0483; G06F 9/451; H04W 4/12; H04W 4/08; H04W 4/14; H04M 1/72436
(Continued)

(56) References Cited

U.S. PATENT DOCUMENTS 7,818,372 B1 * 10/2010 Cutrell ................. G06Q 10/00
715/236
7,877,454 B1 1/2011 Hunter
(Continued)

FOREIGN PATENT DOCUMENTS

CN 1968222 A 5/2007
CN 102801866 A 11/2012
(Continued)

OTHER PUBLICATIONS

Extended European Search Report for European Patent Application No. 20812655.7 issued by the European Patent Office on Jul. 5, 2022.
(Continued)

*Primary Examiner* — Thuong Nguyen
(74) *Attorney, Agent, or Firm* — IP & T GROUP LLP

(57) ABSTRACT

A message sending method includes: receiving N message inputs that is performed in a message input area by a user; displaying N message objects in a message template display area in response to the N message inputs, where the N message objects are used to indicate message contents of N message templates edited by the N message inputs; and sending the message contents indicated by the N message objects to a target contact.

20 Claims, 13 Drawing Sheets

(51) Int. Cl.
*H04L 51/42* (2022.01)
*H04W 4/12* (2009.01)

(58) Field of Classification Search
USPC .......................................................... 709/206
See application file for complete search history.

(56) References Cited

U.S. PATENT DOCUMENTS

| | | | | |
|---|---|---|---|---|
| 8,260,844 | B2* | 9/2012 | Timmons | G06F 16/957 719/329 |
| 8,385,518 | B1* | 2/2013 | Salafia | H04L 51/216 379/265.09 |
| 8,886,735 | B1* | 11/2014 | Liu | G06Q 10/107 715/752 |
| 9,234,763 | B1* | 1/2016 | Savvopoulos | G01C 21/3484 |
| 9,406,047 | B2* | 8/2016 | Albarrak | G06F 16/24522 |
| 10,891,922 | B1* | 1/2021 | Batra | G06V 40/161 |
| 10,977,745 | B1* | 4/2021 | Chiang | G06F 16/835 |
| 2004/0103026 | A1* | 5/2004 | White | G06Q 30/02 705/14.69 |
| 2004/0119742 | A1* | 6/2004 | Silbey | G06F 3/0481 715/760 |
| 2004/0174430 | A1* | 9/2004 | Sawahara | H04N 7/142 348/14.02 |
| 2007/0112927 | A1 | 5/2007 | Jung | |
| 2008/0034117 | A1* | 2/2008 | Lemay | G06Q 10/107 709/245 |
| 2008/0064363 | A1* | 3/2008 | Salafia | H04W 76/50 379/88.13 |
| 2008/0098073 | A1* | 4/2008 | Coleman | G06Q 10/107 715/221 |
| 2008/0104237 | A1* | 5/2008 | Gilfix | H04L 67/02 709/225 |
| 2008/0222257 | A1 | 9/2008 | Mukherjee et al. | |
| 2009/0106370 | A1* | 4/2009 | Dreyfus | H04L 51/00 709/206 |
| 2009/0158149 | A1* | 6/2009 | Ko | G06F 3/04886 715/702 |
| 2010/0053111 | A1* | 3/2010 | Karlsson | G06F 3/04883 345/174 |
| 2010/0077044 | A1* | 3/2010 | Tsubouchi | H04M 1/72409 709/217 |
| 2010/0226585 | A1* | 9/2010 | Hamid | G06T 3/00 382/233 |
| 2010/0331022 | A1* | 12/2010 | Happonen | G06F 3/0488 345/173 |
| 2011/0154338 | A1* | 6/2011 | Ramanathaiah | G06Q 10/06 718/100 |
| 2011/0202594 | A1* | 8/2011 | Ricci | H04M 3/4931 455/414.1 |
| 2011/0235585 | A1 | 9/2011 | Lee et al. | |
| 2011/0261397 | A1* | 10/2011 | Marunouchi | G06F 3/1292 358/1.15 |
| 2012/0015624 | A1* | 1/2012 | Scott | G06F 9/451 715/811 |
| 2012/0154330 | A1* | 6/2012 | Shimizu | G06F 3/016 345/173 |
| 2012/0272192 | A1* | 10/2012 | Grossman | G06F 40/197 715/854 |
| 2012/0330906 | A1* | 12/2012 | Fredericks | G06Q 50/14 707/E17.058 |
| 2013/0283146 | A1* | 10/2013 | Barak | G06F 9/451 715/234 |
| 2014/0032683 | A1* | 1/2014 | Maheshwari | H04L 51/063 709/206 |
| 2014/0143835 | A1* | 5/2014 | Brennan | G06F 40/114 715/239 |
| 2014/0181758 | A1* | 6/2014 | Pasquero | G06F 3/04883 715/863 |
| 2014/0279444 | A1* | 9/2014 | Kassemi | G06Q 20/382 705/39 |
| 2015/0032491 | A1* | 1/2015 | Ulm, Sr. | G06Q 10/06311 705/7.13 |
| 2015/0067047 | A1* | 3/2015 | Fu | H04L 51/403 709/204 |
| 2015/0154676 | A1* | 6/2015 | Matousek | G06F 3/04842 705/26.5 |
| 2015/0195225 | A1* | 7/2015 | Albert | H04L 51/216 709/206 |
| 2015/0348512 | A1* | 12/2015 | Sabatelli | G09G 5/37 345/629 |
| 2016/0104193 | A1* | 4/2016 | Keiser | H04L 51/063 705/14.49 |
| 2016/0117092 | A1* | 4/2016 | Wang | G06F 3/0482 715/786 |
| 2016/0154543 | A1* | 6/2016 | Strulovich | G06F 3/0482 715/739 |
| 2016/0378293 | A1* | 12/2016 | Sirpal | H04N 5/77 715/863 |
| 2017/0004126 | A1* | 1/2017 | Li | G06F 40/106 |
| 2017/0026348 | A1* | 1/2017 | Martinez | G06F 21/606 |
| 2017/0063763 | A1* | 3/2017 | Hu | H04L 51/48 |
| 2019/0377461 | A1* | 12/2019 | Akhanov | G06F 8/38 |
| 2021/0044556 | A1 | 2/2021 | Cui et al. | |
| 2022/0086114 | A1* | 3/2022 | Liang | H04L 12/1886 |

FOREIGN PATENT DOCUMENTS

| | | |
|---|---|---|
| CN | 105657132 A | 6/2016 |
| CN | 106302116 A | 1/2017 |
| CN | 106488419 A | 3/2017 |
| CN | 107506105 A | 12/2017 |
| CN | 108563378 A | 9/2018 |
| CN | 110213729 A | 9/2019 |
| WO | 2016209824 A1 | 12/2016 |

OTHER PUBLICATIONS

Office Action issued by the Chinese Patent Office on Feb. 2, 2021.
Office Action issued by the Chinese Patent Office on Oct. 11, 2021.
International Search Report and Written Opinion issued by the Chinese Patent Office on Aug. 17, 2020.

* cited by examiner

MESSAGE SENDING METHOD AND TERMINAL

CROSS-REFERENCE TO RELATED APPLICATIONS

This application is a Bypass Continuation Application of PCT/CN2020/092373, filed on May 26, 2020, which claims priority to Chinese Patent Application No. 2019104 63299.7 filed on May 30, 2019, which are incorporated herein by reference in their entirety.

TECHNICAL FIELD

Embodiments of the present disclosure relate to the technical field of communication, and in particular, to a message sending method and a terminal.

BACKGROUND

Terminals such as mobile phones have become indispensable tools in people's daily life. As people use the terminals more and more frequently, people's requirements on the terminals become higher and higher, especially the message group sending function of the terminals. The message group sending function of the terminal allows a user to send short messages or instant chat messages to a plurality of other terminals at one time, thereby reducing the number of times of editing and sending messages by the user, and improving the operation convenience of the terminal and the user experience effect.

SUMMARY

Embodiments of the present disclosure provide a message sending method and a terminal.

According to a first aspect, the embodiments of the present disclosure provide a message sending method, applied to a terminal. The method includes:
  receiving N message inputs that is performed in a message input area by a user;
  displaying N message objects in a message template display area in response to the N message inputs, wherein the N message objects are used to indicate message contents of N message templates edited by the N message inputs; and
  sending the message contents indicated by the N message objects to a target contact.

According to a second aspect, the embodiments of the present disclosure further provide a terminal, including:
  a first input module, configured to receive N message inputs that is performed in a message input area by a user;
  a first display module, configured to display N message objects in a message template display area in response to the N message inputs, wherein the N message objects are used to indicate message contents of N message templates edited by the N message inputs; and
  a sending module, configured to send the message contents indicated by the N message objects displayed by the first display module to a target contact.

According to a third aspect, the embodiments of the present disclosure further provide a terminal, including a processor, a memory, and a computer program stored in the memory and executable on the processor, wherein when the computer program is executed by the processor, the steps of the message sending method are implemented.

According to a fourth aspect, the embodiments of the present disclosure further provide a non-transitory computer-readable storage medium, wherein the non-transitory computer-readable storage medium stores a computer program; and when the computer program are executed by a processor, the steps of the message sending method are implemented.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure efforts shall fall within the protection scope of the present disclosure.

Usually, in the message group sending function of the terminal, in a case that a user needs to send at least two different messages to corresponding contacts, the user needs to edit the messages one by one and add the corresponding contacts to send the messages, and it is necessary to switch the message interface for many times in the sending process. Therefore, a large number of messages need to be sent, the operation is cumbersome and time-consuming. It can be seen that in the process of sending messages, the terminal in the related art has the problem of low message sending efficiency caused by the cumbersome and time-consuming operation.

Figure 1:
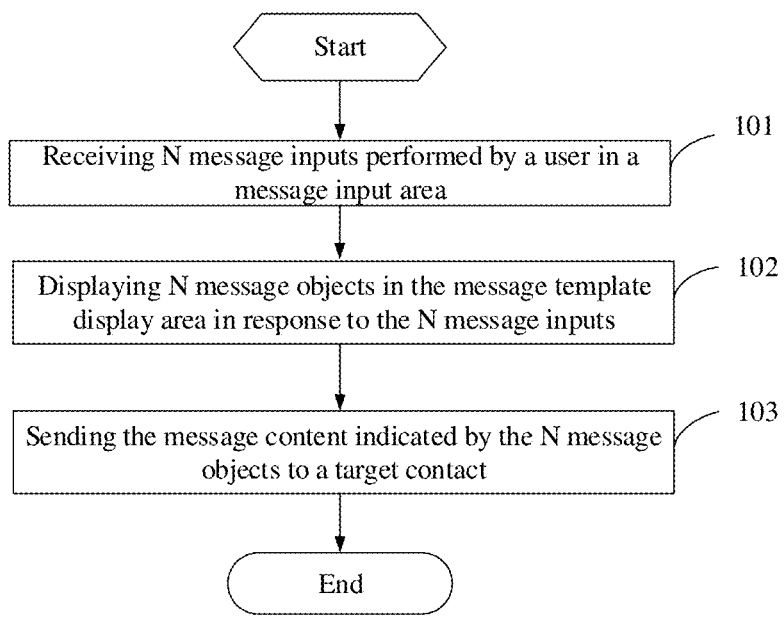
FIG. 1 is a first schematic flowchart of a message sending method according to an embodiment of the present disclosure.

Referring to FIG. 1, it is a schematic flowchart of a message sending method according to an embodiment of the present disclosure. As shown in FIG. 1, the message sending method includes the following steps:

step 101: receiving N message inputs that is performed in a message input area by a user;

step 102: displaying N message objects in a message template display area in response to the N message inputs, wherein the N message objects are used to indicate message contents of N message templates edited by the N message inputs; and step 103: sending message content of the N message objects to a target contact.

Herein, the terminal may display the N message objects of the N message templates edited by the N message inputs in the message template display area according to the received N message inputs performed by the user in the message input area, and send the message contents indicated by the N message objects to the target contact, so that in the process of sending the message content of a plurality of message templates, the terminal may edit a plurality of message templates in the same interface at one time and send the message templates without switching the message interface, the terminal is convenient and time-saving in operation, and the message sending efficiency is improved.

It should be noted that the message input area and the message template display area may be different areas displayed in the same message interface. For example, it may be that the terminal displays the message interface in a case that the terminal receives the message interface for indicating display, the message interface includes the message input area and the message template display area, and the message interface may be a chat interface of an instant messaging application program. In addition, sizes, shapes and positions of the message input area and the message template display area may be fixed or changed, which is not limited herein.

Figure 2A:
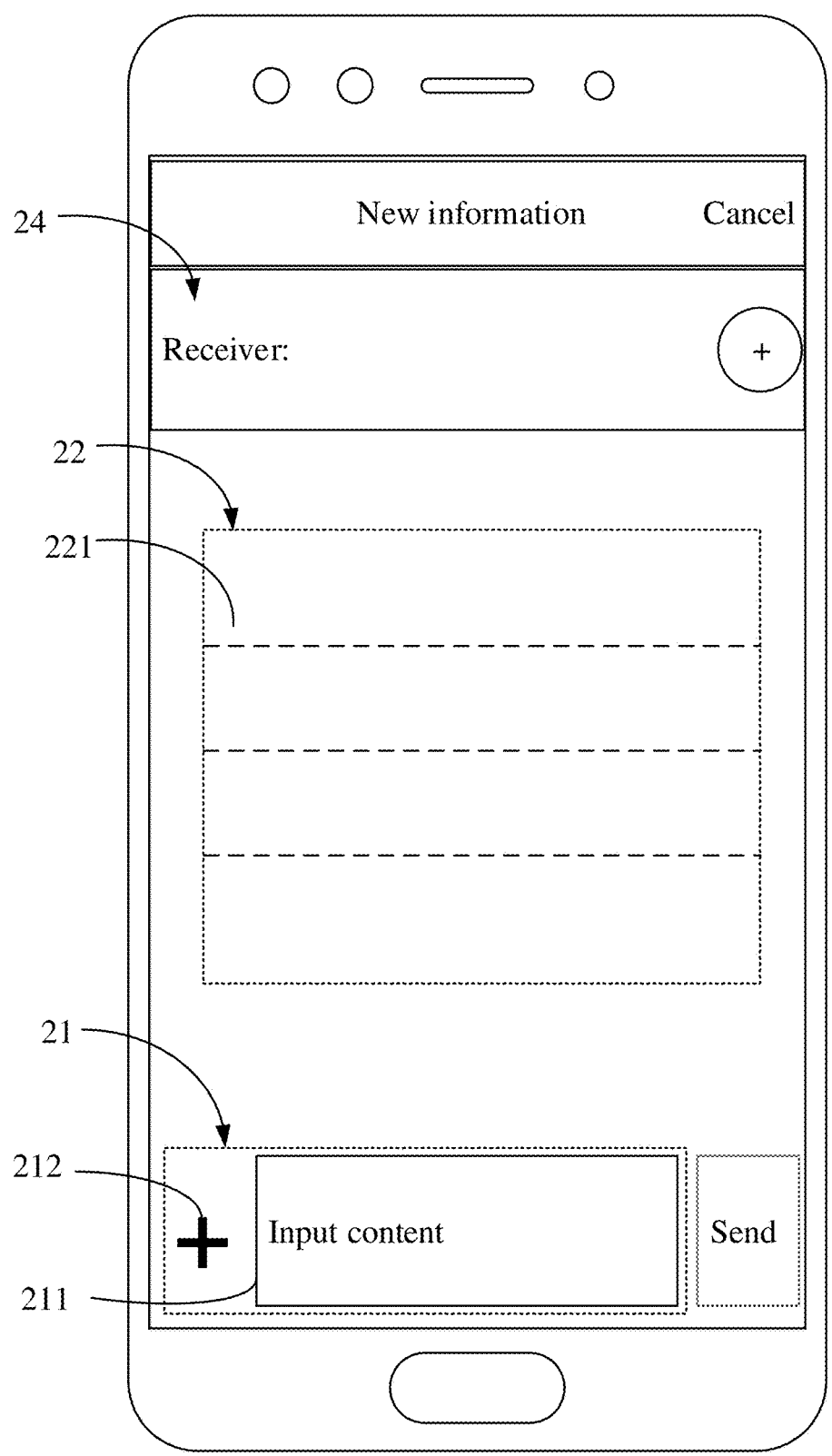
FIG. 2A is a first schematic diagram of a display interface of a terminal according to an embodiment of the present disclosure.

Exemplarily, as shown in FIG. 2A, the message interface displays a message input area 21 and a message template display area 22, and the message input area 21 may be used for a user to edit the message content of the message template; and the message template display area 22 may display a message object of a message template edited by a user in the message input area 21.

In the above step 101, when a user needs to send a plurality of messages with different message contents, the user may input N message inputs for editing the message contents of the N message templates in the message input area, and the terminal may receive the N message inputs performed by the user.

In this embodiment, each message input is an input for independently editing the message content of one message template, and the message input may be a voice input or a text input.

Exemplarily, as shown in FIG. 2A, the message input area 21 displays a text input box 211, a user may input text in the text input box 211, that is, the message input includes an operation for inputting text, and the terminal takes the text input by the user as the message content of the message template; or the message input area 21 also displays a plug-in control 212, a user may call out a voice input sub-control by clicking the plug-in control 212, and when a user presses the voice input sub-control and inputs voice, the terminal determines that the message input is received and takes the content of voice input by the user as the message content of the message template, and the like.

In the step 102, in a case that the terminal receives the N message inputs, the terminal may display the message objects of the N message templates edited by the N message inputs in the message template display area in response to the N message inputs, and each message object is used to indicate the message content of the message template.

It should be noted that displaying the N message objects in the message display area in response to the N message inputs may be that when receiving that a user completes one message input, the terminal displays the message object of the message template edited by this message input in the message template display area until the user completes N message inputs, and the terminal displays all of the N message objects in the message template display area.

In this embodiment, the message object may be any object for indicating the message content of the corresponding message template. Optionally, the message object may be the message content of the corresponding message template, or may also be a message icon of the message template, and the message icon is used to indicate the message content of the message template.

In addition, displaying the N message objects in the message template display area may be that the terminal may display the N message objects in rows or in columns in the message template display area. For example, it may be that the terminal arranges and displays the message contents of the N message templates sequentially from top to bottom in the message template display area, and the like.

In some implementation manners, the message template display area may include at least one sub-display area, each sub-display area includes one message object, and each message object includes message content of a message template indicated by the message object.

Herein, the terminal may display the message content indicated by each message object in a corresponding sub-display area, that is, the terminal displays the message contents of the N message templates in N sub-display areas in the message template display area respectively, so that the message contents of the N message templates can be displayed in different areas, the message content of each message template can be displayed visually, and the display effect of the terminal can be improved.

It should be noted that at least one sub-display area in the above message template display area may be N sub-display areas, or may also be more than N sub-display areas; in addition, the at least one sub-display area may be preset and fixed, or may also be automatically added by the terminal according to the message input of the terminal, for example, it may be a sub-display area added and displayed in the message template display area when the terminal receives one message input, which is not limited herein.

In addition, that the terminal displays the message contents of the N message templates in the at least one sub-display area may be that the terminal automatically displays the message content of the message template emitted by this message input into an associated sub-display area when receiving that one message input is completed. For example, it may be that the message template display area of the terminal displays N sub-display areas, the N sub-display areas are preset with the serial number, and in a case that the terminal receives the k-th message input, if the terminal detects that a user does not input content in a preset duration, the terminal determines that the k-th message input is completed and displays the message content of the message template edited by the k-th message input in a sub-display area with the serial number being k, wherein k is a positive integer less than or equal to N.

In some implementation manners, the step of displaying N message objects in the message template display area in response to the N message inputs includes:

in a case that an i-th message input is received, displaying an i-th message template input by the i-th message input in the message input area, and displaying an i-th target identifier, wherein the i-th target identifier associates with the i-th message template, and i is a positive integer less than or equal to N;

receiving a first input for associating the i-th target identifier with a first sub-display area; and displaying message content of the i-th message template in the first sub-display area in response to the first input. Herein, the terminal may display the i-th message template and the corresponding i-th target identifier according to the i-th message input performed by the user, and display the message content of the i-th message template in a first sub-display area in the at least one sub-display area according to the first input performed by the user for associating the i-th target identifier with the first input of the first sub-display area, so that the message content of each message template may be displayed in a sub-display area specified by the user.

In this implementation manner, each message template associates with one target identifier, and the target identifier may be a control or an icon.

In addition, the first input may be any input capable of establishing an association relationship between the i-th target identifier and a first sub-display area, which may be at least one of a voice input, a gesture input or a touch input, wherein the touch input may be a sliding operation, a pressing operation or a clicking operation.

Figure 2B:
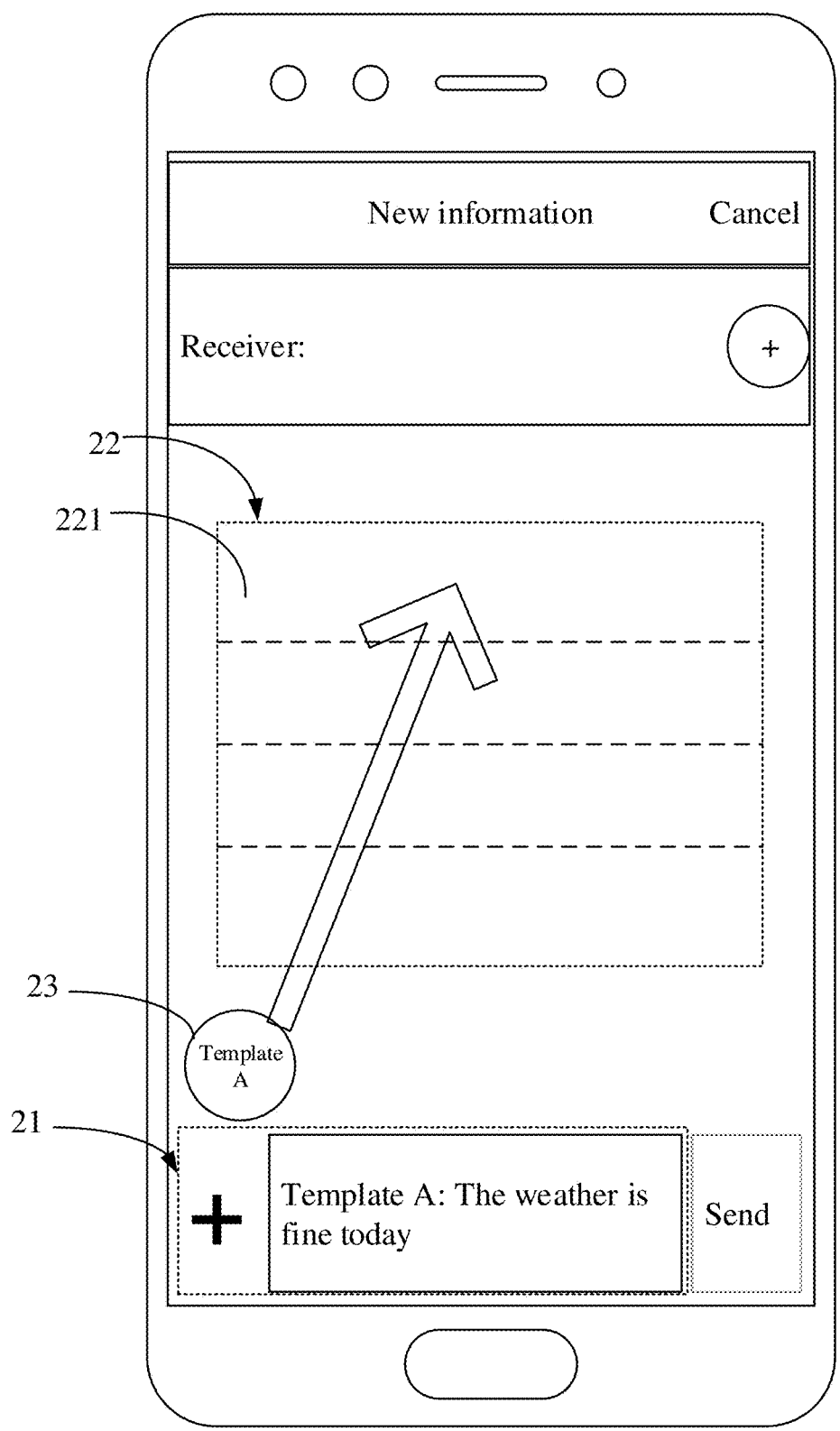
FIG. 2B is a second schematic diagram of a display interface of a terminal according to an embodiment of the present disclosure.

Exemplarily, as shown in FIG. 2A, the message 22 includes N sub-display areas 221; moreover, under the text input (that is, the i-th message input) that is performed in an input box 211 of a message input area 21 by a user, the terminal displays the message content of the message template edited by the text input in the input box 211, and displays a thumbnail icon (that is, the i-th target identifier) associated with the message template in the message input area 21, for example, if the text input is an input of a message content of an editing template A, the terminal displays a thumbnail small icon 23 of the template A in the message input area 21, as shown in FIG. 2B.

Figure 2C:
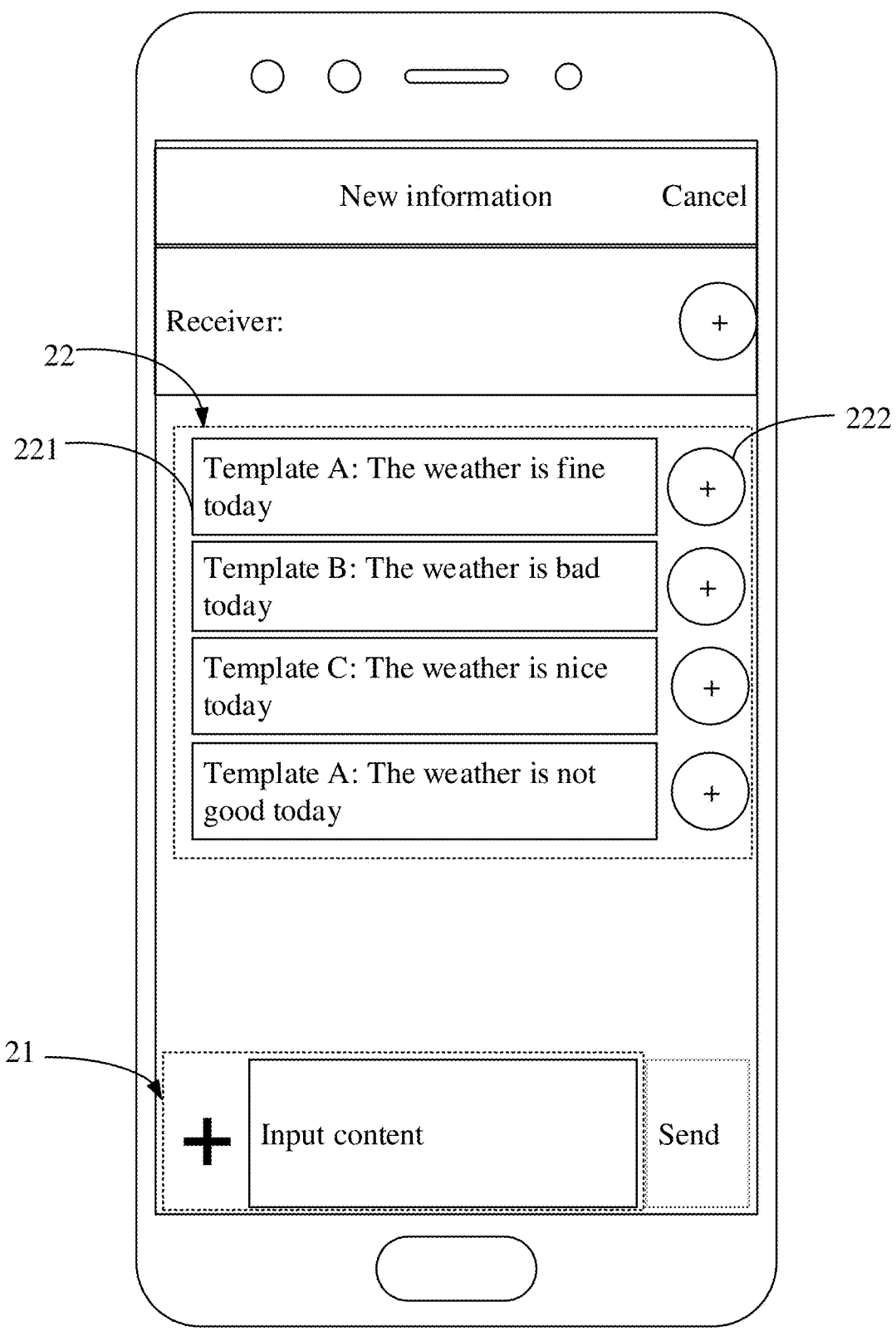
FIG. 2C is a third schematic diagram of a display interface of a terminal according to an embodiment of the present disclosure.

After the terminal receives this text input is completed, if the terminal receives a drag input (that is, a first input) performed by a user for dragging the thumbnail small icon in the message input area 21 to a certain sub-display area 221 (that is, a first sub-display area), the terminal displays the message template content associated with the thumbnail small icon in the sub-display area 221, for example, as shown in FIG. 2B, in a case of receiving that the user drags the thumbnail small icon 23 of the template A to the topmost sub-display area, the terminal displays the message content of the template A in the topmost sub-display area; and by repeating the message input and the first input for many times, the terminal may display the message contents of the N message templates in the N sub-display areas 221 respectively, as shown in FIG. 2C, the message contents of the template A, a template B, a template C and a template D are displayed in four sub-display areas respectively.

In some other implementation manners, the terminal may display N message objects in the message template display area and may also arranges and displays message icons of the N message templates in the message template display area, and each message icon associates with the message content of the corresponding message template, for example, in a case of displaying N sub-display areas in the message template display area, the terminal may also display a message icon of one message template in each sub-display area.

Optionally, the step of displaying the N message objects in the message template display area in response to the N message inputs may include: in a case that the i-th message input is received, displaying an i-th message template input by the i-th message input in the message input area, and displaying an i-th target identifier, wherein the i-th identifier associates with the i-th message template and i is a positive integer less than or equal to N; receiving a first input for associating the i-th target identifier with a first sub-display area; and displaying a message icon of the i-th message template in the first sub-display area in response to the first input.

In the above step 103: after the terminal displays the N message objects in the message template display area, the terminal may send the message contents indicated by the N message objects to a target contact, that is, send the message content of the N message templates to the target contact.

In this embodiment, the target contact may be one or more contacts selected by the terminal according to a contact selecting input performed by a user; moreover, sending the message contents indicated by the N message objects to the target contact may be to send the message contents indicates by any two of the N message objects to the same contact, or may be to send to different contacts, which is not limited herein.

Optionally, sending the message contents indicated by the N message objects to the target contact may be that the terminal may preset an association relationship between each message template and at least one contact according to the input performed by a user, and send the message content of each message template to a contact preset with an association relationship.

Exemplarily, as shown in FIG. 2A, the message interface also displays a contact adding area 24, and the contact adding area 24 is used to select a contact in a contact list of the terminal; in a case that the message contents of the N message templates are displayed in the N sub-display areas, that is, as shown in FIG. 2C, when the terminal receives a sub-area selecting input (such as a duration or strength of pressing the target sub-display area exceeds a preset threshold) in a target sub-display area in the N sub-display areas, the terminal sets the message template in the target sub-display area as a to-be-added contact status; and when the terminal receives a contact selecting input performed by a user for selecting a contact in the contact adding area 24, the terminal takes the selected contact as a contact associated with the message template displayed in the target display area, and the terminal may send the message content of the target sub-display area to the associated contact.

In some implementation manners, in a case that the message template display area includes the at least one sub-display area, before the step 103, the method may include:

displaying at least one contact control, wherein the at least one contact control is arranged corresponding to the at least one display area;

receiving a second input performed by a user for a target contact control in at least one contact control; and displaying a contact selected by the second input in the second sub-display area in response to the second input, wherein the second sub-display area associates with the target contact control.

The step 103 may include:

sending the message content displayed in the second sub-display area to the contact selected by second input.

Herein, the terminal may set a corresponding contact control for each sub-display area and send the message content of the message template displayed in the second sub-display area to a contact selected by a user through a contact control associated with the second sub-display area, so that the user may set the contact for each sub-display area as required, and the message content of each message template is sent to the contact selected by the user.

In this implementation manner, the second input may be any input of selecting a contact by the target contact control, and may include at least one of a voice input, a gesture input or a touch input. For example, the second input may include: a clicking input for clicking the target contact control to acquire a contact list, and a voice input for indicating a contact in the contact list.

Exemplarily, as shown in FIG. 2C, the message template display area 22 may also display one contact control 222 beside the N sub-display areas 221, and each sub-display area 221 corresponds to the contact control 222 beside the sub-display area 221 (that is, the message template display area 22 also includes N contact controls 222); in a case that the terminal receives a contact selecting input (that is, a second input) performed by a user on the target contact control 222, the terminal may add at least one contact for the sub-display area 221 corresponding to the target contact control 22, and the terminal sends the message content of the message template displayed in the sub-display area 221 corresponding to the target contact control 22 to the sub-display area 221 to add at least one contact.

It should be noted that the contact control is used to add at least one contact for the sub-display area corresponding to the contact control, which may independently select each contact by a user for the corresponding sub-display area through the contact control, or may add one contact group for the corresponding sub-display area according to a preset contact tag in the contact list, wherein the contact group includes at least one contact, or may add a contact and a contact group at the same time.

Figure 2D:
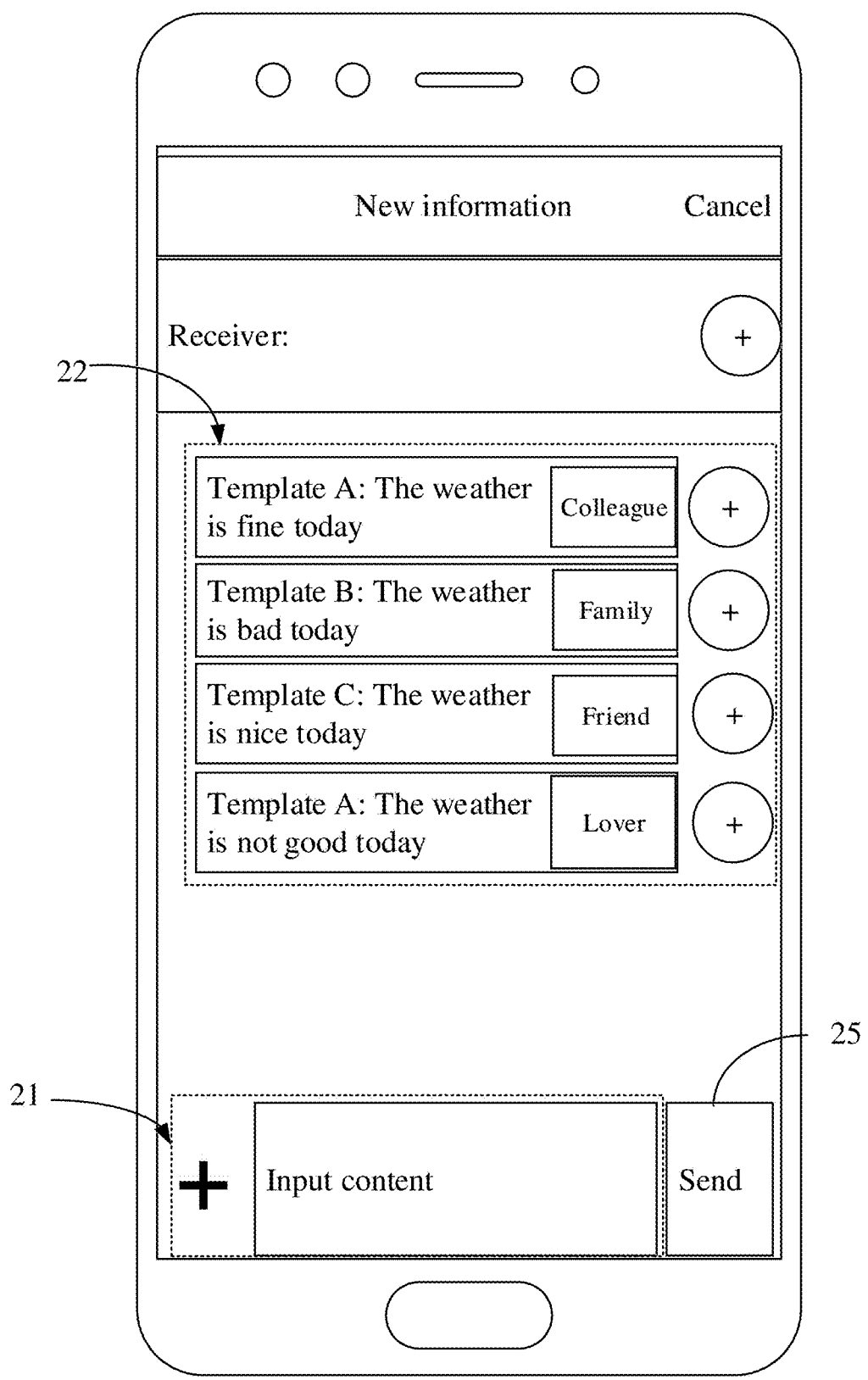
FIG. 2D is a fourth schematic diagram of a display interface of a terminal according to an embodiment of the present disclosure.

For example: as shown in FIG. 2D, the terminal may add one contact group for each sub-display area 221 respectively according to an input performed by a user on N contact controls 222, such as adding a "colleague" contact group for the sub-display area 221 of a display template 1, adding a "family" contact group for the sub-display area 221 of a display template 2, . . . , and adding a "friend" contact group for the sub-display area 221 of a display template N, and the like.

In this implementation manner, the above different contact controls may add the same contact and/or contact group, or may also add different contacts and/or contact groups, which is not limited herein.

It should be noted that in a case that the sub-display area displays a message icon, similarly, a contact and/or contact group may be added for each sub-display area through the at least one contact control, which is not elaborated herein.

Certainly, the terminal may also set an associated contact for each message template through other manners, and send the message content of the message template to the associated contact. Optionally, it may be that the terminal further displays a contact display area in the message interface, the contact sub-display area displays at least one contact sub-display area, each contact sub-display area may be used for a user to select a contact and display the contact selected by the user, and the terminal may send the message content indicated by each of the N message objects to the contact displayed in the associated contact sub-area according to that input that is performed by the user for associating the contact sub-area with the message object.

Figure 3A:
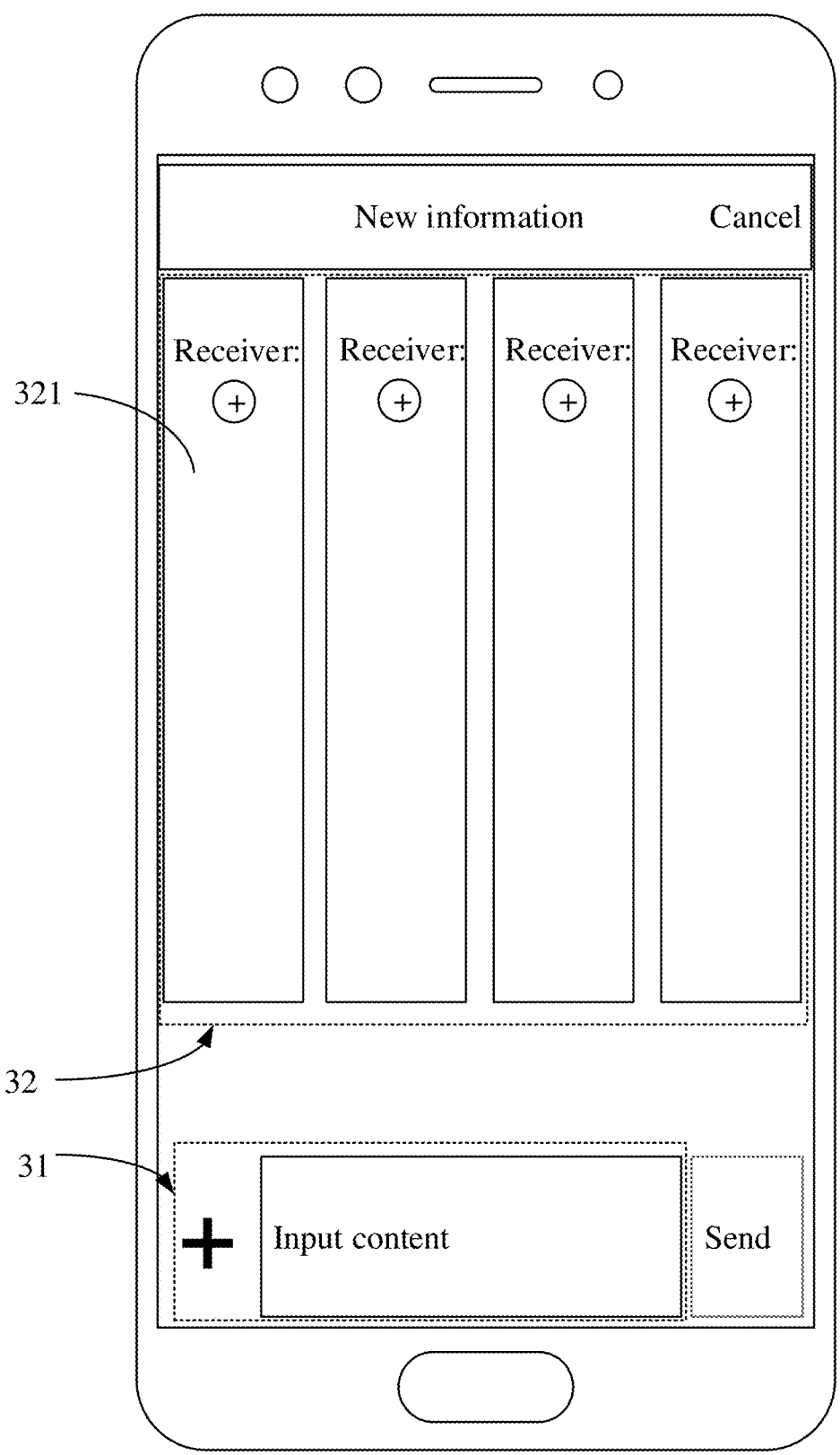
FIG. 3A is a sixth schematic diagram of a display interface of a terminal according to an embodiment of the present disclosure.
Figure 3B:
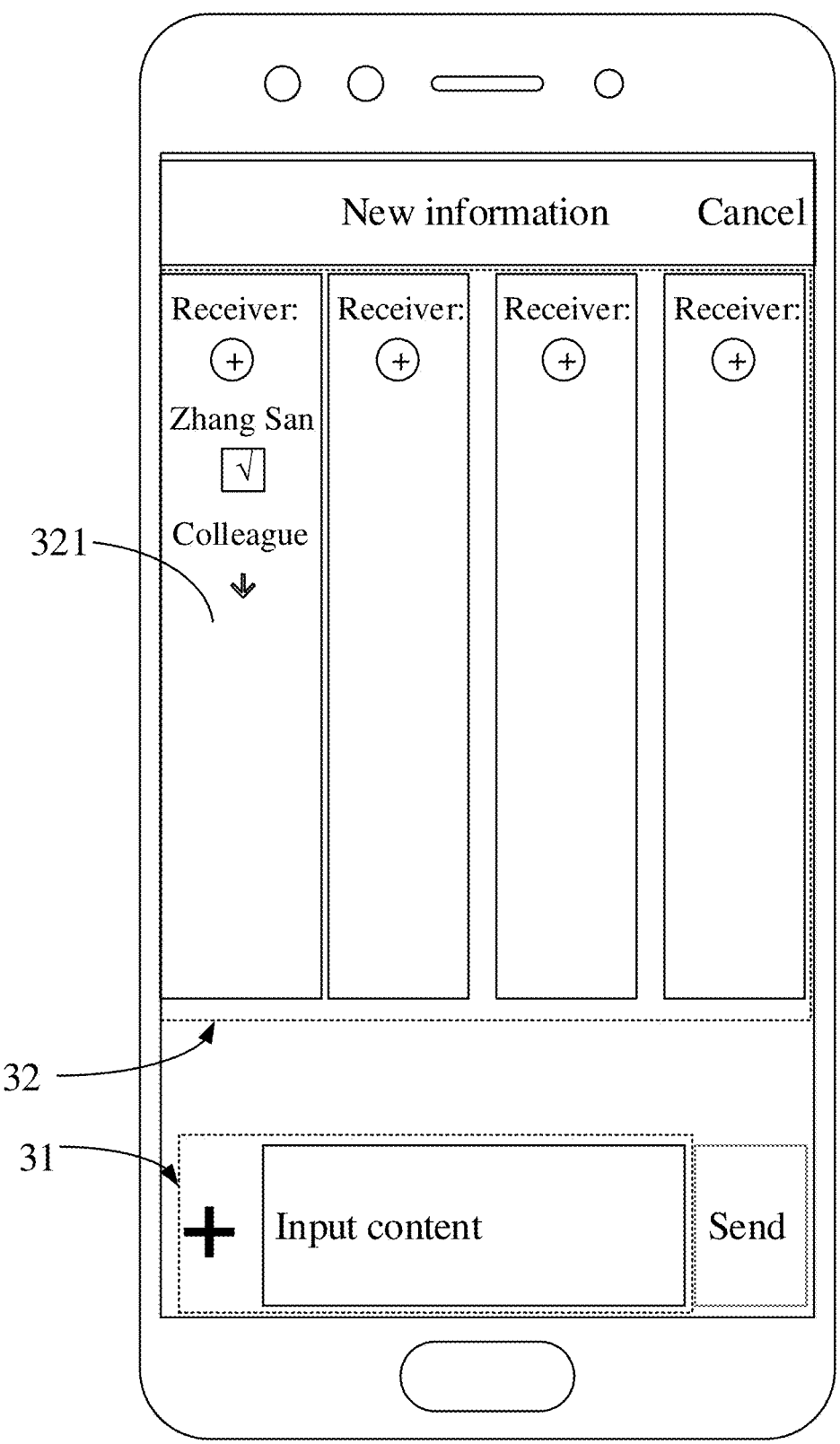
FIG. 3B is a seventh schematic diagram of a display interface of a terminal according to an embodiment of the present disclosure.
Figure 3C:
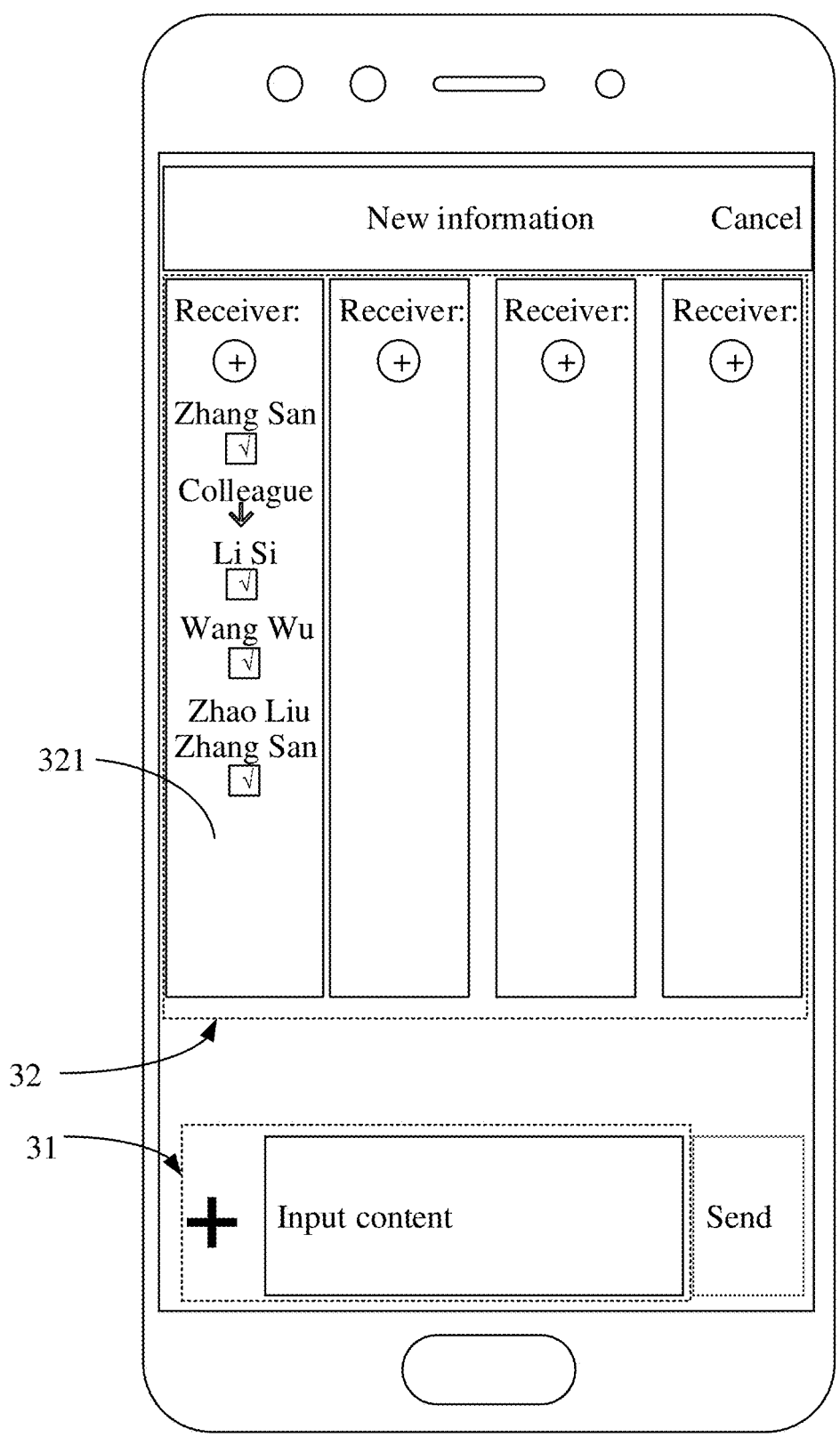
FIG. 3C is an eighth schematic diagram of a display interface of a terminal according to an embodiment of the present disclosure.
Figure 3D:
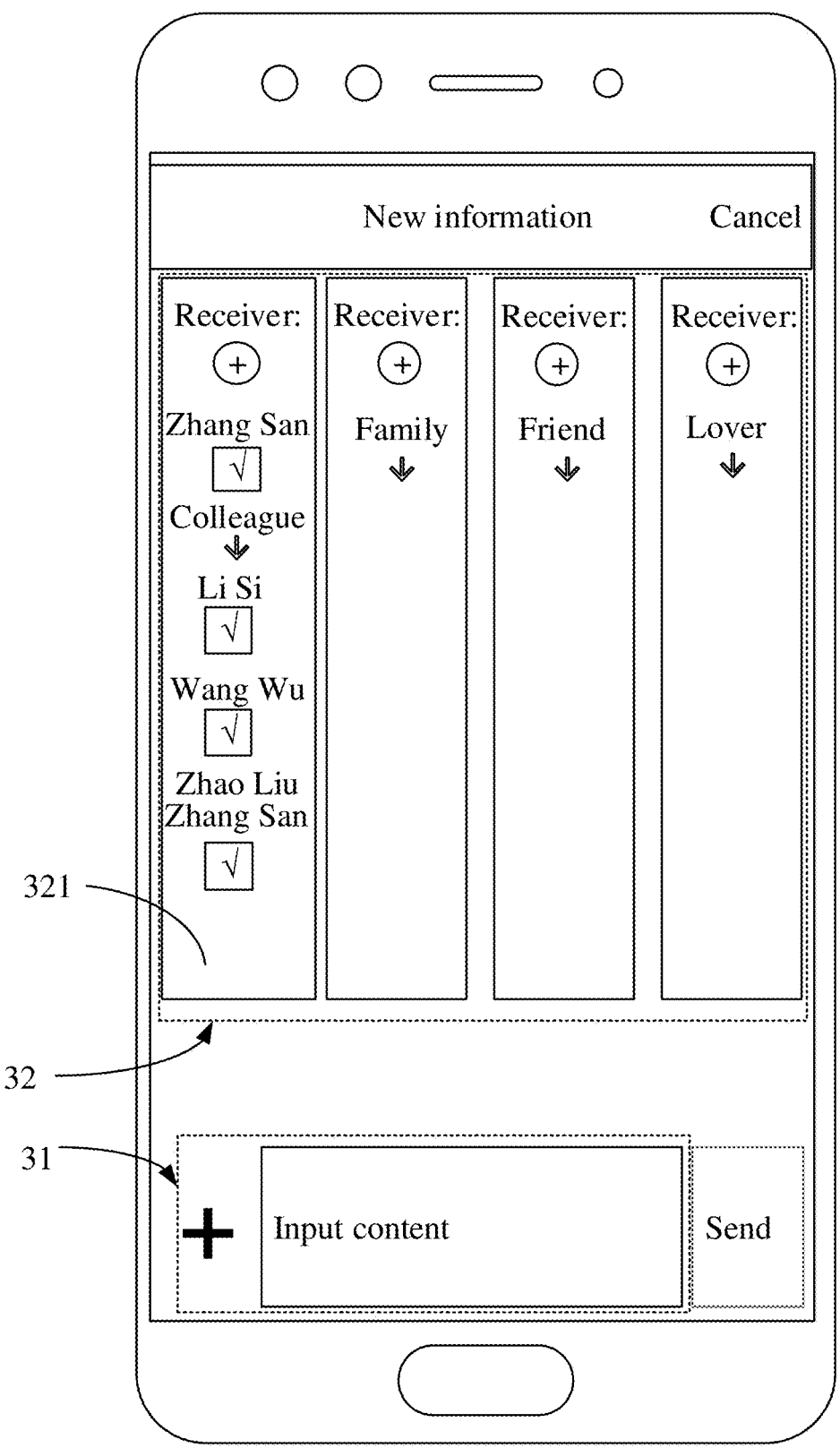
FIG. 3D is a ninth schematic diagram of a display interface of a terminal according to an embodiment of the present disclosure.

Exemplarily, as shown in FIG. 3A, the message interface displays a message input area 31 and a contact display area 32, and the contact display area 32 displays at least one contact sub-display area 321, for example, displays four contact sub-display areas 321. In a case that the terminal receives an input for adding a contact in a certain contact sub-display area 321, the terminal may display the contact added by a user in the contact sub-display area 321, and the contact may be an independent contact or a contact group; as shown in FIG. 3B, an independent contact and a contact group are added in the contact sub-display area 321 at the same time, and the terminal may expand the contact group in the contact sub-display area 321, as shown in FIG. 3C, so that the contact is added for at least one contact sub-display area 321, as shown in FIG. 3D; and when the terminal receives an input for associating M message objects with at least one contact sub-display area 321, the terminal may send the message contents indicated by M message objects to the contact displayed in the contact sub-display area 321 associated with the M message objects.

In this embodiment, sending the message contents indicated by the N message objects to the target contact may be: in a case that the terminal receives an input performed by a user for indicating to send the message contents of all the message templates, sequentially sending the message contents of the N message templates in response to the input; or may also be: in a case that the terminal receives N message sending inputs performed by the user, sending the message contents of the N message templates in response to the N message sending inputs, each message sending input being used to indicate to send the message content of one message template.

In this embodiment, sending the message contents indicated by the N message objects to the target contact may be: receiving a first sending instruction performed by a user, the first sending instruction being used to indicate to send the message contents of N message templates; sequentially sending the message contents of the N message templates to the target contact in response to the first sending instruction, so that the terminal may send all the message contents of the N message templates at one time according to the received sending instruction, that is, the message contents of the N message templates can be sent with one key, and the message sending operation is convenient and time-saving.

Exemplarily, as shown in FIG. 2D, after the terminal adds the contacts for the N sub-display areas 221, in a case that the terminal receives an operation of clicking a "sending" control 25 by a user (that is, the terminal receives the first sending instruction), the terminal may sequentially transmit the message contents of the N message templates to the associated contacts.

Certainly, in a case that the terminal also displays a contact display area, the terminal may also sequentially send the message contents of the N message templates to the associated contacts according to a one-time input performed by the user, for example, when the message template display area displays N message objects, the terminal may receive N drag inputs performed by the user, the drag input is used to drag one message object to one contact sub-display area, the terminal displays an identifier (such as a thumbnail) associated with the dragged at least one message object in each contact sub-area in response to the N drag inputs, and the message content indicated by the dragged message object in each contact sub-area is in a to-be-sent status; and after all the message objects are dragged to the contact sub-area, the terminal receives a clicking input performed by a user on a sending message control and sends the message contents indicated by all the message objects in response to the clicking input, and the message content indicated by the message object identified in each contact sub-area is sent to the contact displayed in the contact sub-area.

In addition, sending the message contents indicated by the N message objects to the target contact may also be: receiving N second sending instructions performed by a user, the second sending instruction being used to indicate to send the message content of one message template; sending the message contents indicated by the N message objects to the target contact in response to the N second sending instructions, so that the terminal may singly send the message content of one message template according to each second sending instruction of the user, and the N message templates are sent more flexibly.

Exemplarily, as shown in FIG. 2D, after the terminal adds the contacts for the N sub-display areas 221, in a case that the terminal receives a clicking operation input by a user to continuously clicking the target sub-display area 221 in the N sub-display areas 221 for twice (that is, the terminal receives one second sending instruction), the terminal may send the message content of the message template corresponding to the target sub-display area 221.

It should be noted that in a case that the terminal displays the at least one contact control and the at least one sub-display area at the same time, and the at least one contact control is arranged in one-to-one correspondence with the at least one sub-display area, the terminal may add the N messages to the at least one sub-display area first according to that input that is performed by the user and then an associated contact for each sub-display area to which the message object is added; or may also select an associated contact for each sub-display area first and then add the message object to the sub-display area where the contact is selected, which is not limited here.

Exemplarily, the terminal may display at least one sub-display area 221 in the message template display area 22 firstly, as shown in FIG. 2A; display the message content of one message template in each display sub-display area 221 in a case of receiving an input performed by a user to edit a plurality of templates (that is, N message inputs), as shown in FIG. 2C; and then display the selected contact in each sub-display area 221 in a case of receiving an input performed by the user to select the contact for each sub-display area 221 (that is, a second input), so as to edit the message template first and then select the contact.

In some implementation manners, after the step 103, the method further includes:
receiving a fourth input performed by a user in a contact display area, and
displaying a contact selected by the fourth input in a target contact sub-display area in the contact display area in response to the fourth input, wherein the display area displays at least one contact sub-display area.

The step of sending the message contents indicated by the N message objects to the target contact includes:
receiving a fifth input performed by a user for associating the target contact sub-display area with a target message object; and
sending message content indicated by the target message object to a contact displayed in the target contact sub-display area in response to the fifth input.

Here, in a case that the terminal displays the contact display area including at least one contact sub-display area, the terminal may select the contact for the target contact sub-display area according to the fourth input performed by the user, may send the message content indicated by the target message object to the contact displayed by the target contact sub-display area according to the fifth input performed by the user for associating the target contact sub-display area with the target message object, and may send the message content of any message template to the associated contact according to the indication of the user, so that the user experience effect is improved and operation is convenient and time-saving.

In this implementation manner, the target contact sub-display area may be any contact sub-display area of the at least one contact sub-display area; the target message object may one or more message objects in the N message objects, and each message object may include the message content of the message template, or each message object may also include a message icon of the message template, so that it is easier for the user to operate the message object.

Here, the target contact sub-display area is a plurality of contact sub-display areas, and in a case that the target message object is one message object, the terminal may rapidly send the message content of the same message template to different contacts; and the target contact sub-display area is one contact sub-display area, and in a case that the target message object is a plurality of message objects, the terminal may rapidly send the contents of different message templates to the same contact.

In addition, the fourth input may be any operation for selecting a contact, which may be at least one of a voice input, a gesture operation or a touch operation.

The fifth input may be any input for associating the target contact sub-display area with the target message object, and may also be at least one of a voice input, a gesture operation or a touch operation, for example, it may be a sliding input, and the sliding rack of the sliding input passes through the target contact sub-display area and the target message object; or in a case that each message object includes the message icon of the message template, the fifth input may include: an input for moving the message icon of the target message template to the target contact sub-display area, so that the operation of the user is more convenient and time-saving.

It should be noted that in a case that the terminal also displays a contact display area, the terminal may also display the at least one sub-display area in the message template display area, which is not limited here.

Figure 3E:
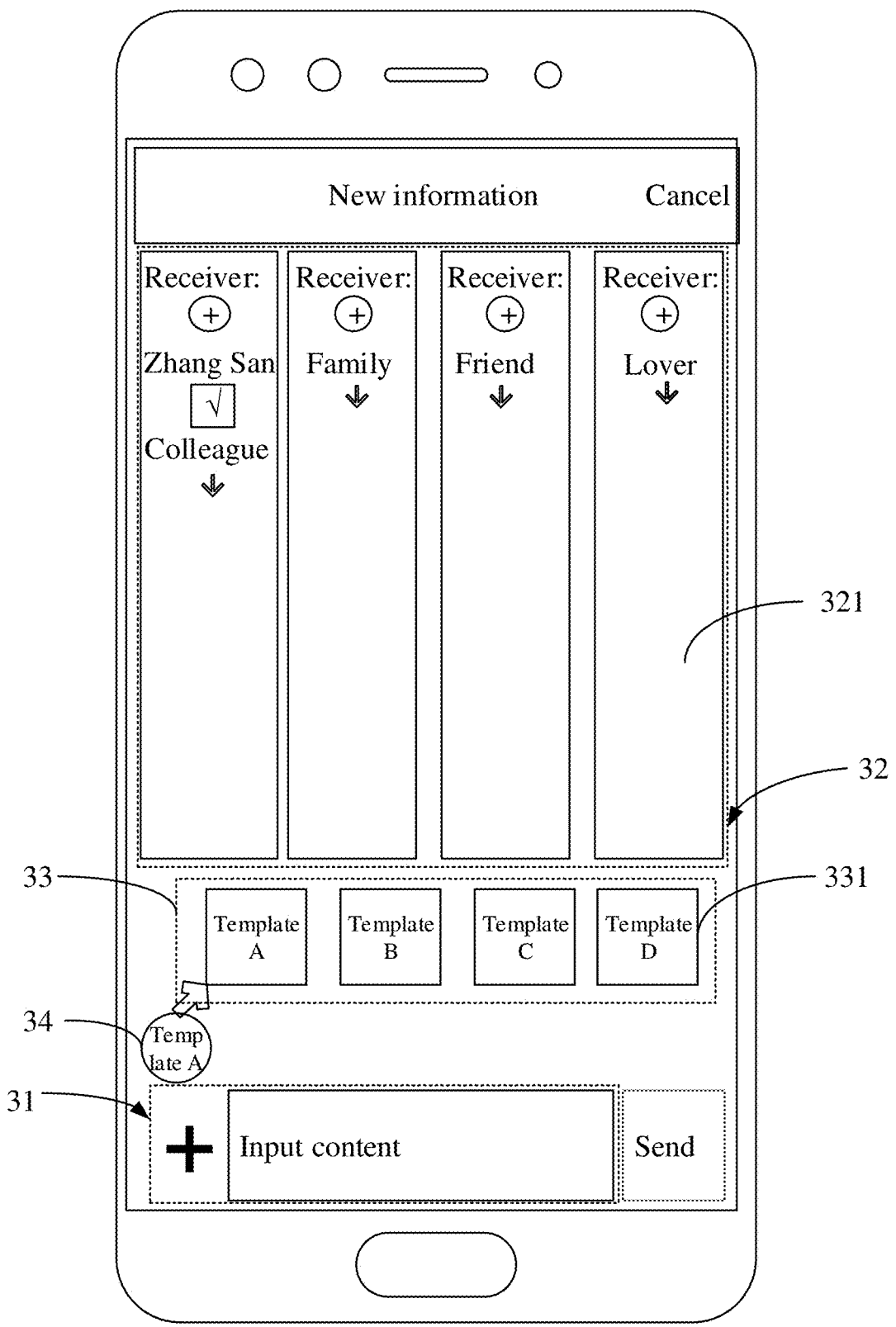
FIG. 3E is a tenth schematic diagram of a display interface of a terminal according to an embodiment of the present disclosure.
Figure 3F:
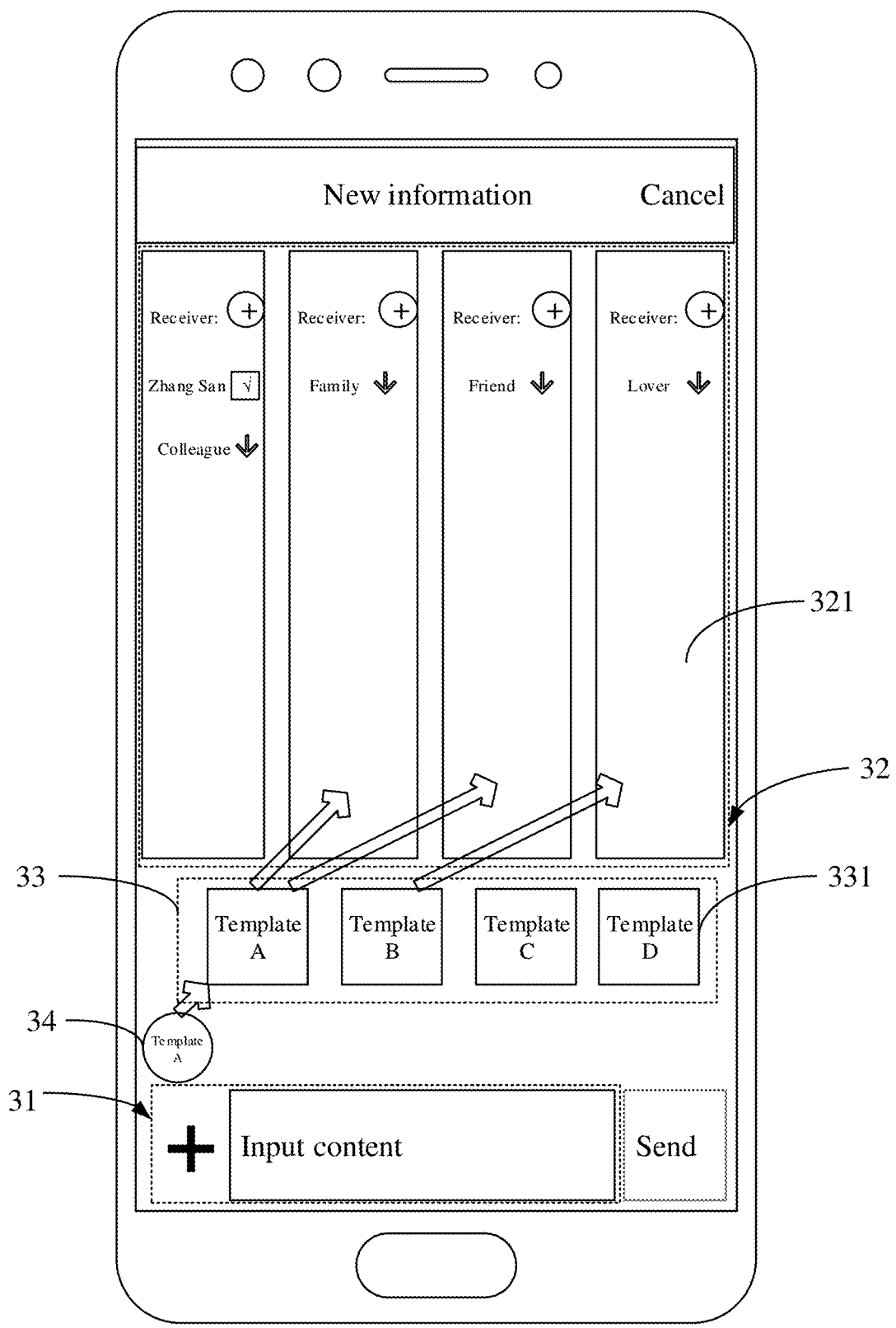
FIG. 3F is an eleventh schematic diagram of a display interface of a terminal according to an embodiment of the present disclosure.

Exemplarily, as shown in FIG. 3D, after the terminal adds the contact for the at least one contact sub-display area 321, in a case that the terminal receives the N message inputs performed by the user, the terminal displays message icons 331 (that is, N message objects) of the N message templates in the message template display area 33 of the message interface, such as a template A, a template B, a template C and a template D;

in a case that the terminal receives the message input for editing the message content of one message template every time, the terminal displays a target identifier 34 associated with the message template in the message input area, and in a case that the terminal receives that a user drags the target identifier 34 to the message template display area 33, the terminal displays the message icon 331 (that is, the message object) of the message template in the message template display area 33, as shown in FIG. 3E; and when the terminal receives that the user drags the message icon of the template A to the contact sub-display area 321 which displays a "family" contact group, the terminal sends the message content of the template A to the contact in the "family" contact group, and when the terminal receives that the user drags the message icon of the template B to the contact sub-display area 321 which displays a "friend" contact group, the terminal sends the message content of the template B to the contact in the "friend" contact group, as shown in FIG. 3F.

Certainly, in a case that the contact display area displays at least one contact sub-display area, according to that input that is performed by the user, the terminal may select the contact in the at least one contact sub-display area first and then display N message objects in the message template display area, or may display N message objects in the message template display area first and then select the contact in the at least one contact sub-display area, which is not limited here.

For example, the terminal displays the selected contact in each contact sub-display area 321 in a case of receiving an input (that is, a fourth input) performed by a user to select a contact in each contact sub-display area 321, as shown in FIG. 3B to FIG. 3D; then displays the message icons of the N message templates in the message template display area 33 in a case of receiving inputs (that is, N message inputs) performed by a user to edit N message templates in the message input area, as shown in FIG. 3E; and finally sends the message content of the target message template to the contact displayed in the target contact sub-display area 321 in a case of receiving an input (that is, a fifth input) of the user to drag the message content of the target message template to the target contact sub-display area 321.

It should be noted that in the process that the terminal sends the message contents of the N message templates, the terminal may also identify the sending status of the message content of each message template in a certain manner, so that the display effect of the terminal is improved.

In some implementation manners, in a case that the message template display area includes the at least one sub-display area, the step 103 may include:

receiving a third input performed by a user; and sending message contents of N message templates in response to the third input, and displaying a progress bar in each sub-display area which displays the message content, wherein the progress bar is configured to indicate the sending progress of the message content in the corresponding sub-display area.

Figure 2E:
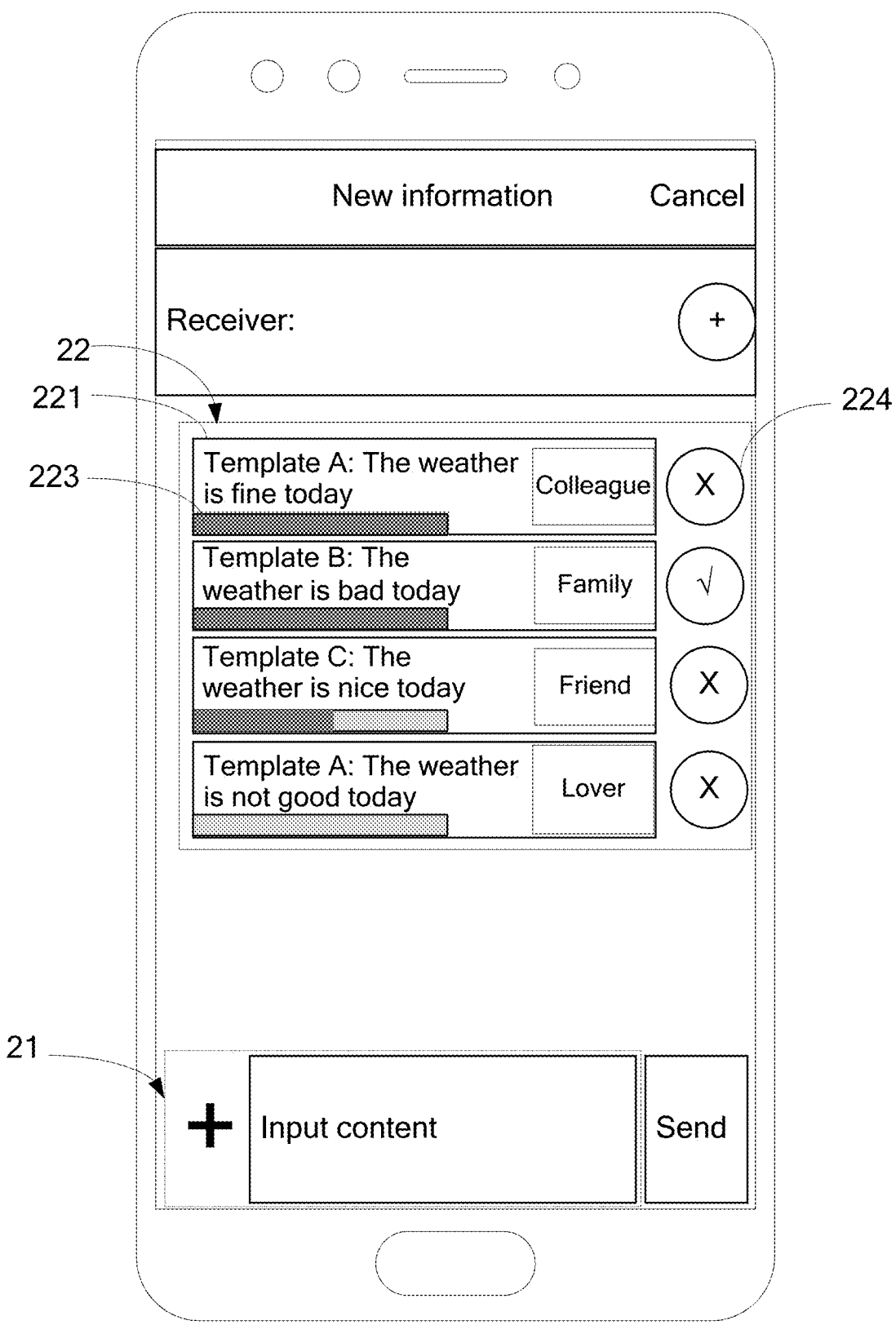
FIG. 2E is a fifth schematic diagram of a display interface of a terminal according to an embodiment of the present disclosure.

Here, the terminal may display a progress bar in each sub-display area which displays the message content so as to the sending progress of the message content of each message template can be intuitively shown to the user, and the display effect of the terminal can be improved. For example, as shown in FIG. 2E, the progress bar 223 is displayed in each sub-display area 221, and the progress bar 223 is configured to indicate the sending progress of the message content displayed in the sub-display area 221 where the progress bar is located.

In the implementation manner, the third input may be an input for indicating to send the message content of the N message templates, which may be at least one of a voice input, a gesture input or a touch input.

Certainly, in the process that the terminal sends the message content of the N message template, the terminal may also display a sending identifier for indicating whether the message content of each message template is sent successfully. For example, as shown in FIG. 2E, the message template display area 22 may also display N sending identifiers 224 arranged in one-to-one correspondence with N sub-display areas, wherein each sending identifier 224 is configured to identify whether the message content displayed by the corresponding sub-display area is sent successfully, for example, "x" indicates sending failure and "V" indicates sending success; and the terminal may also identify whether each message template is sent to the associated contact successfully, for example, when the contact is displayed in green, it means that the message content of the associated message template is sent to the contact successfully, and when the contact is displayed in red, it means that the message content of the associated message template has failed to be sent to the contact, and so on.

In some implementation manners, before the step 103, the method may further includes:

receiving a seventh input performed by a user for a target message object in N message objects;

displaying message content of the target message template indicated by the target message object in the message input area in response to the seventh input;

receiving an eighth input performed by a user for editing the message content of the target message template; and updating the message content of the target message template into the content edited by the eighth input in response to the eighth input.

Here, the terminal may update, namely, re-edit, the message content of the target message template according to the seventh input and the eighth input performed by the user, and the operation is convenient and time-saving.

In the implementation manner, the seventh input may be any input for indicating to display the message content indicated by the target message object in a message input area, which may be at least one of a voice input, a gesture input or a touch input. For example, the seventh input may be an input for dragging the target message object to the message input area, or an input for clicking the target message for a preset times.

In addition, the eighth input may be an input for editing the message content of the target message template in the message input area, and may be a voice input or a text input, which is not limited here.

Exemplarily, as shown in FIG. 2C, in a case that the terminal receives an input (that is, a seventh input) performed by a user to select a sub-display area 221 which displays a target message object and drag to a message input box 211, the terminal may display the message content of the message template (that is, the target message template) display in the sub-display area 221 in the message input box 211, and in a case that the terminal receives an input (that is, an eighth input) performed by a user to modify the message content in the message input box 211, the terminal modifies the message content in the sub-display area 221 according to that input that is performed by the user to modify the message content, for example, the terminal displays the message content of the template A in the message input box 211 when the user selects the sub-display area where the template A is located and drags to the message input box 211, the terminal modifies the message content of the sub-display area where the template A is located when the user modifies the message content in the message input box 211, such as modifying "The weather is fine today" in the message input box 211 into "it's sunny today", the terminal modifies the message content of the sub-display area where the template A is located from "The weather is fine today" to "it's sunny today";

or as shown in FIG. 3E, when the terminal receives an input (that is, a seventh input) performed by a user to click the message icon (that is, the target message object) of the template A continuously for twice, the terminal displays the message content of the template A in the message input area 31, and changes the message content indicated by the message icon of the template A according to that input that is performed by the user to modify the message content in the message input area 31.

In addition, one message content may be sent to a plurality of contacts and each contact has a different title, so in some implementation manners, in a case that the target message template associates with K contacts, K being an integer greater than 1, the step 103 may include: generating K to-be-sent messages of the target message template in the background process, wherein the K to-be-sent messages associate with the K contacts one by one and the message content of each to-be-sent message includes the title of the associated contact; and sending a target to-be-sent message to the associated contact, so that the terminal may adjust the names in the message content according to different contacts, and the message sending quality can be improved.

For example, as shown in FIG. 2D, after the user adds a "colleague" contact group to the sub-display area 221 which displays the display content of the template A, if the "colleague" contact group includes two contacts, the terminal generates two to-be-sent messages associated with the two contacts in the background process, the message content of each to-be-sent message includes the title of the associated contact, and each to-be-sent message is sent to the associated contact after the user clicks a "sending" control; or as shown in FIG. 3F, after the user drags the message icon of the template A to the contact sub-display area 321 which displays a "family" contact group, if the "family" contact group includes three contacts, the terminal generates three to-be-sent messages associated with the three contacts in the background process, the message content of each to-be-sent message includes the name of the associated contact, and each to-be-sent message is sequentially sent to the associated contact.

In the embodiments of the present disclosure, the method includes: receiving N message inputs that is performed in a message input area by a user; displaying N message objects in a message template display area in response to the N message inputs, wherein the N message objects are used to indicate message contents of N message templates edited by the N message inputs; and sending the message contents indicated by the N message objects to a target contact. In this way, in the process of sending messages, the terminal may edit a plurality of message templates in the same interface at one time and send the messages without switching the message interface, so that the terminal is convenient and time-saving in operation, and the message sending efficiency is improved.

Figure 4:
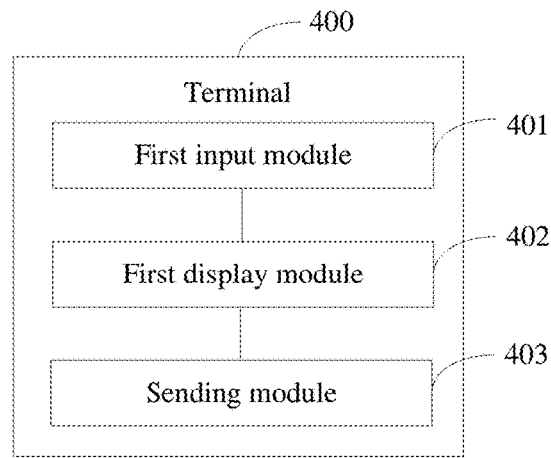
FIG. 4 is a structural schematic diagram of a terminal according to an embodiment of the present disclosure.

Referring to FIG. 4, FIG. 4 is a structural schematic diagram of a terminal according to an embodiment of the present disclosure. As shown in FIG. 4, the terminal 400 includes:

a first input module 401, configured to receive N message inputs that is performed in a message input area by a user;

a first display module 402, configured to display N message objects in a message template display area in response to the N message inputs 401, wherein the N message objects are used to indicate message contents of N message templates edited by the N message inputs; and a sending module 403, configured to send the message contents indicated by the N message objects displayed by the first display module 402 to a target contact.

Optionally, the message template display area includes at least one sub-display area, each sub-display area includes one message object, and each message object includes message content of a message template indicated by the message object.

Optionally, the terminal 400 further includes:

a second display module, configured to display at least one contact control, wherein the at least one contact control is arranged in one-to-one correspondence with the at least one display area;

a second input module, configured to receive a second input performed by a user for a target contact control of the at least one contact control displayed by the second display module; and a third display module, configured to display a contact selected by the second input in a second sub-display area in response to the second input, wherein the second sub-display area associates with the target contact control.

The sending module may be configured to:

send message content displayed in the second sub-display area to the contact selected by the second input displayed by the third display module.

Optionally, the first display module 402 includes:

a first display unit, configured to display an i-th message template input by an i-th message input in the message input area in a case that the i-th message input is received, and display an i-th target identifier, wherein the i-th target identifier associates with the i-th message template, and the i is a positive integer less than or equal to N;

a first input unit, configured to receive a first input for associating the i-th target identifier with a first sub-display area displayed by the first display unit; and a second display unit, configured to display the message content of the i-th message template in the first sub-display area in response to the first input received by the input unit.

Optionally, the sending module 403 includes:

a second input unit, configured to receive a third input performed by a user; and a first sending unit, configured to send message contents of the N message templates in response to the third input received by the second input unit, and display a progress bar in each sub-display area which displays the message content, wherein the progress bar is configured to indicate the sending progress of the message content in the corresponding sub-display area.

Optionally, the terminal 400 further includes:

a third input module, configured to receive a fourth input performed by a user in a contact display area; and a fourth display module, configured to display a contact selected by the fourth input in a target contact sub-display area in the contact display area in response to the fourth input received by the third input module, wherein the contact display area displays at least one contact sub-display area.

The sending module includes:

a third input unit, configured to receive a fifth input performed by a user for associating the target contact sub-display area displayed by the fourth display module with the target message object displayed by the first display module; and a second sending unit, configured to send message content indicated by the target message object to a contact displayed in the target contact sub-display area in response to the fifth input received by the third input unit.

Optionally, each message object includes a message icon of a message template.

Optionally, the fifth input includes: an input for moving a message icon of a target message template to the target contact sub-display area.

Optionally, the terminal 400 further includes:

a fourth input module, configured to receive a seventh input performed by a user for a target message object in the N message objects displayed by the first display module;

a fifth display module, configured to display the message content of the target message template indicated by the target message object in the message input area in response to the seventh input received by the fourth input module;

a fifth input module, configured to receive an eighth input performed by a user for editing the message content of the target message template displayed by the fifth display module; and a sixth display module, configured to update the message content of the target message template into the content edited by the eighth input in response to the eighth input received by the fifth input module.

The terminal 400 can implement the processes implemented by the terminal in the foregoing embodiment and achieve a same beneficial effect. To avoid repetition, details are not described herein again.

Figure 5:
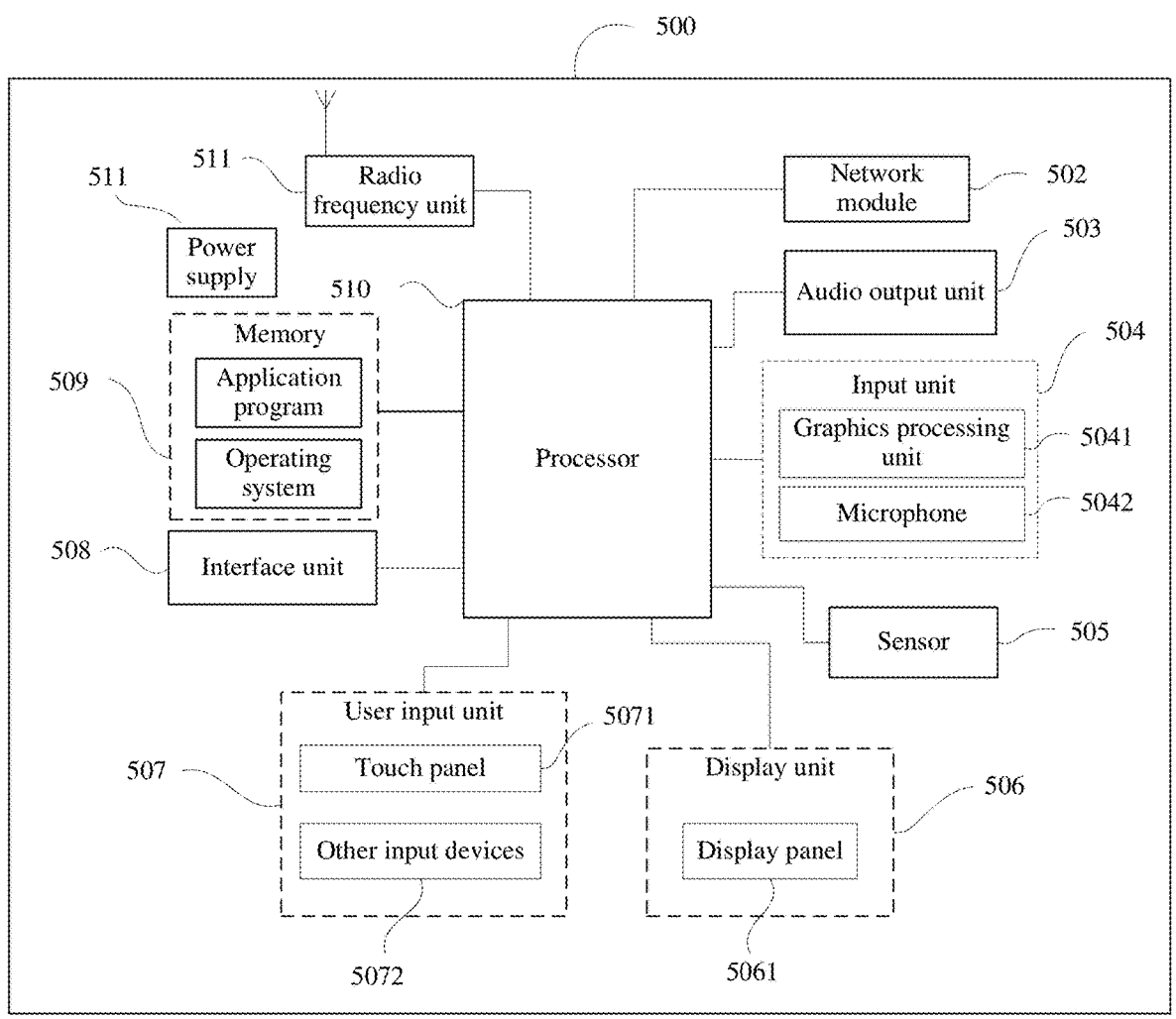
FIG. 5 is a schematic diagram of a hardware structure of a terminal according to an embodiment of the present disclosure.

FIG. 5 is a schematic structural diagram of hardware of a terminal implementing embodiments of the present disclosure. The terminal 500 includes but is not limited to: a radio frequency unit 511, a network module 502, an audio output unit 503, an input unit 504, a sensor 505, a display unit 506, a user input unit 507, an interface unit 508, a memory 509, a processor 510, a power supply 511, and other components. The display unit 506 is a display screen. Those skilled in the art may understand that the terminal structure shown in FIG. 5 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a laptop computer, a palmtop computer, a vehicle-mounted terminal, a wearable device, a pedometer, and the like.

The processor 510 is configured to:

receive N message inputs that is performed in a message input area by a user;

display N message objects in a message template display area in response to the N message inputs, wherein the N message objects are used to indicate message contents of N message templates edited by the N message inputs; and send the message contents indicated by the N message objects to a target contact.

Optionally, the message template display area includes at least one sub-display area, each sub-display area includes one message object, and each message object includes message content of a message template indicated by the message object.

Optionally, the processor 510 is further configured to:

display at least one contact control, wherein the at least one contact control is arranged in one-to-one correspondence with the at least one display area;

receive a second input in a target contact in the at least one contact control; display a contact selected by the second input in a second sub-display area in response to the second input, wherein the second sub-display area associates with the target contact control; and send message content displayed in the second sub-display area to the contact selected by the second input.

Optionally, the processor 510 is further configured to:

in a case that an i-th message input is received, display an i-th message template input by the i-th message input in the message input area, and display an i-th target identifier, wherein the i-th target identifier associates with the i-th message template, and the i is a positive integer less than or equal to N; receive a first input for associating the i-th target identifier with a first sub-display area; and display message content of the i-th message template in the first sub-display area in response to the first input.

Optionally, the processor 510 is further configured to:

receive a third input performed by a user; and send message contents of the N message templates in response to the third input, and display a progress bar in each sub-display area which displays the message content, wherein the progress bar is configured to indicate the sending progress of the message content in the corresponding sub-display area.

Optionally, the processor 510 is further configured to:

receive a fourth input performed by a user in a contact display area; and display a contact selected by the fourth input in a target contact sub-display area in the contact display area in response to the fourth input, wherein the contact display area displays at least one contact sub-display area; and receive a fifth input performed by a user for associate the target contact sub-display area with the target message input; send message content indicated by the target message object to a contact displayed in the target contact sub-display area in response to the fifth input.

Optionally, each message object includes a message icon of a message template.

Optionally, the fifth input includes: an input for moving a message icon of a target message template to the target contact sub-display area.

Optionally, the processor 510 is further configured to:

receive a seventh input performed by a user for a target message object in the N message objects;

display message content of the target message template indicated by the target message object in the message input area in response to the seventh input;

receive an eighth input performed by a user for editing the message content of the target message template; and update the message content of the target message template into the content edited by the eighth input in response to the eighth input.

The terminal 500 can implement the processes implemented by the terminal in the foregoing embodiment and achieve a same beneficial effect. To avoid repetition, details are not described herein again.

It should be understood that, in this embodiment of the present disclosure, the radio frequency unit 511 may be configured to receive and send information or a signal in a call process. For example, after receiving downlink data from a base station, the radio frequency unit 511 sends the downlink data to the processor 510 for processing. In addition, the radio frequency unit 511 sends uplink data to the base station. Generally, the radio frequency unit 511 includes butis not limited to an antenna, at least one amplifier, a transceiver, a coupler, a low noise amplifier, a duplexer, and the like. In addition, the radio frequency unit 511 may also communicate with other devices through a wireless communication system and network.

The terminal provides wireless broadband Internet access for the user by using the network module 502, for example, helping the user to send and receive an e-mail, browse a web page, and access streaming media.

The audio output unit 503 may convert audio data received by the radio frequency unit 511 or the network module 502 or stored in the memory 509 into an audio signal and output as voice. In addition, the audio output unit 503 may further provide audio output (for example, a call signal received voice, or a message received voice) related to a specific function executed by the mobile terminal 500. The audio output unit 503 includes a loudspeaker, a buzzer, a receiver, and the like.

The input unit 504 is configured to receive an acoustic signal or a video signal. The input unit 504 may include a graphics processing unit (GPU) 5041 and a microphone 5042. The graphics processing unit 5041 is used to process image data of a static picture or a video obtained by an image capturing device (for example, a camera) in a video capturing mode or an image capturing mode. A processed image frame may be displayed on the display unit 506. The image frame processed by the graphics processing unit 5041 may be stored in the memory 509 (or another storage medium) or sent by using the radio frequency unit 511 or the network module 502. The microphone 5042 may receive sound and can process such sound into audio data. The processed audio data may be converted, in a call mode, into a format that may be transmitted to a mobile communication base station by using the radio frequency unit 511 for output.

The terminal 500 further includes at least one sensor 505, such as a light sensor, a motion sensor, and other sensors. The light sensor includes an ambient light sensor and a proximity sensor. The ambient light sensor may adjust luminance of the display panel 5061 based on brightness of ambient light. The proximity sensor may turn off the display panel 5061 and/or backlight when the terminal 500 moves to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by the user or information provided for the user. The display unit 506 may include a display panel 5061, and the display panel 5061 may be configured in a form of a liquid crystal display (LCD), an organic light-emitting diode (OLED), or the like.

A user input unit 507 may be configured to receive input digital or character information, and generate key signal input related to user setting and function control of a terminal. The user input unit 507 includes a touch panel 5071 and another input device 5072. The touch panel 5071 is also referred to as a touchscreen, and may collect a touch operation performed by a user on or near the touch panel 5071 (such as an operation performed by a user on the touch panel 5071 or near the touch panel 5071 by using any proper object or accessory, such as a finger or a stylus). The touch panel 5071 may include two parts: a touch detection device and a touch controller. The touch detection device detects a touch position of the user, detects a signal brought by a touch operation, and transmits the signal to the touch controller. The touch controller receives touch information from the touch detection device, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray type, and a surface acoustic wave type. In addition to the touch panel 5071, the user input unit 507 may further include other input devices 5072. The other input devices 5072 may include but are not limited to: a physical keyboard, a function key (such as a volume control key, a switch key), a trackball, a mouse, and a joystick, which is no longer repeated here.

Optionally, the touch panel 5071 may cover the display panel 5061. After detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, the touch panel 5071 and the display panel 5061 are used as two independent components to implement input and output functions of the terminal. However, in some embodiments, the touch panel 5071 and the display panel 5061 may be integrated to implement the input and output functions of the terminal. This is not specifically limited herein.

The interface unit 508 is an interface connecting an external device to the terminal 500. For example, the external device may include a wired or wireless headset jack, an external power supply (or a battery charger) port, a wired or wireless data port, a memory card port, a port for connecting a device having an identification module, an audio input/output (I/O) port, a video I/O port, and a headset jack. The interface unit 508 can be configured to receive an input (for example, data information and power) from the external device and transmit the received input to one or more elements in the terminal 500, or transmit data between the terminal 500 and the external device.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal, and connects all parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. Optionally, the processor 510 may be integrated with an application processor and a modem processor. The application processor mainly processes the operating system, the user interface, applications, etc. The modem processor mainly processes wireless communication. It may be understood that the modem processor may not be integrated into the processor 510.

The terminal 500 may further include a power supply 511 (for example, a battery) that supplies power to various components. Optionally, the power supply 511 may be logically connected to the processor 510 through a power supply management system, thereby achieving functions of managing charging, discharging, and power consumption through the power supply management system.

In addition, the terminal 500 includes some functional modules not shown. Details are not described herein again.

Optionally, the embodiments of the present disclosure further provide a terminal, including a processor 510, a memory 509, and a computer program stored in the memory 509 and executable on the processor 510, wherein when the computer program is executed by the processor 510, various process of the message sending method embodiment are implemented, and the same technical effect can be achieved. To avoid repetition, details are not described herein again.

The embodiments of the present disclosure further provide a non-transitory computer-readable storage medium. The non-transitory computer-readable storage medium stores a computer program, and when the computer program is executed by a processor, various processes of the foregoing message sending method embodiment are implemented, and the same technical effect can be achieved. To avoid repetition, details are not described herein again. The non-transitory computer-readable storage medium is, for example, a read-only memory (ROM), a random access memory (RAM), a magnetic disk, or an optical disk.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A message sending method, performed by a terminal and comprising:
   receiving N message inputs that is performed in a message input area by a user; wherein N is a integer greater than 1;
   displaying N message objects in a message template display area in response to the N message inputs, wherein the N message objects are used to indicate message contents of N message templates edited by the N message inputs; and
   sending the message contents indicated by the N message objects to a target contact; wherein
   the message template display area comprises at least one sub-display area, each sub-display area comprises one message object, and each message object is used to display the message content of one of the N message templates respectively; wherein
   the displaying N message objects in the message template display area in response to the N message inputs comprises:
   in a case that an i-th message input is received, displaying an i-th message template by the i-th message input in the message input area, and displaying an i-th target identifier, to display the N message templates and N target identifiers; the i-th target identifier associating with the i-th message template, the i-th message input being any one of the N message inputs, and the i being a positive integer less than or equal to N;
   receiving a first input for associating the i-th target identifier with a first sub-display area; and
   displaying message content of the i-th message template in the first sub-display area in response to the first input.

2. The method according to claim 1, wherein before the sending the message contents indicated by the N message objects to a target contact, the method further comprises:
   displaying at least one contact control, the at least one contact control being arranged in one-to-one correspondence with the at least one sub-display area;
   receiving a second input performed by a user for a target contact control of the at least one contact control, and displaying a contact selected by the second input in a second sub-display area in response to the second input, the second sub-display area associating with the target contact control; and the sending the message contents indicated by the N message objects to a target contact comprises:

sending message content displayed in the second sub-display area to the contact selected by the second input.

3. The method according to claim 1, wherein the sending the message contents indicated by the N message objects to a target contact comprises:

receiving a third input performed by a user; and in response to the third input, sending the message contents of the N message templates, and displaying a progress bar in each sub-display area which displays message content; wherein the progress bar is configured to indicate the sending progress of the message content in the corresponding sub-display area.

4. The method according to claim 1, wherein before the sending the message contents indicated by the N message objects to a target contact, the method further comprises:

receiving a fourth input performed by a user in a contact display area, and displaying a contact selected by the fourth input in a target contact sub-display area in the contact display area in response to the fourth input, the contact display area displaying at least one contact sub-display area; and the sending the message contents indicated by the N message objects to the target contact comprises:

receiving a fifth input performed by a user for associating the target contact sub-display area with a target message object, and sending a message content indicated by the target message object to a contact displayed in the target contact sub-display area in response to the fifth input.

5. The method according to claim 4, wherein each message object comprises a message icon of a message template.

6. The method according to claim 5, wherein the fifth input comprises: an input for moving a message icon of a target message template to the target contact sub-display area.

7. The method according to claim 1, wherein before the sending the message contents indicated by the N message objects to a target contact, the method further comprises:

receiving a seventh input performed by a user for a target message object in the N message objects;

displaying a message content of the target message template indicated by the target message object in the message input area in response to the seventh input;

receiving an eighth input performed by a user for editing the message content of the target message template; and updating the message content of the target message template into the content edited by the eighth input in response to the eighth input.

8. A terminal, comprising a processor, a memory, and a computer program stored in the memory and executable on the processor, wherein the computer program, when executed by the processor, causes the terminal to perform:

receiving N message inputs that is performed in a message input area by a user; wherein N is an integer greater than 1;

displaying N message objects in a message template display area in response to the N message inputs, wherein the N message objects are used to indicate message contents of N message templates edited by the N message inputs; and sending the message contents indicated by the N message objects to a target contact; wherein the message template display area comprises at least one sub-display area, each sub-display area comprises one message object, and each message object is used to display the message content of one of the N message templates respectively; wherein the computer program, when executed by the processor, causes the terminal to further perform:

in a case that an i-th message input is received, displaying an i-th message template by the i-th message input in the message input area, and displaying an i-th target identifier, to display the N message templates and N target identifiers; the i-th target identifier associating with the i-th message template, the i-th message input being any one of the N message inputs, and the i being a positive integer less than or equal to N;

receiving a first input for associating the i-th target identifier with a first sub-display area; and displaying message content of the i-th message template in the first sub-display area in response to the first input.

9. The terminal according to claim 8, wherein the computer program, when executed by the processor, causes the terminal to further perform:

displaying at least one contact control, the at least one contact control being arranged in one-to-one correspondence with the at least one display area;

receiving a second input performed by a user for a target contact control of the at least one contact control, and displaying a contact selected by the second input in a second sub-display area in response to the second input, the second sub-display area associating with the target contact control; and the computer program, when executed by the processor, causes the terminal to perform:

sending message content displayed in the second sub-display area to the contact selected by the second input.

10. The terminal according to claim 8, wherein the computer program, when executed by the processor, causes the terminal to perform:

receiving a third input performed by a user; and in response to the third input, sending the message contents of the N message templates, and displaying a progress bar in each sub-display area which displays message content; wherein the progress bar is configured to indicate the sending progress of the message content in the corresponding sub-display area.

11. The terminal according to claim 8, wherein the computer program, when executed by the processor, causes the terminal to further perform:

receiving a fourth input performed by a user in a contact display area, and displaying a contact selected by the fourth input in a target contact sub-display area in the contact display area in response to the fourth input, the contact display area displaying at least one contact sub-display area; and the computer program, when executed by the processor, causes the terminal to perform:

receiving a fifth input performed by a user for associating the target contact sub-display area with a target message object, and sending a message content indicated by the target message object to a contact displayed in the target contact sub-display area in response to the fifth input.

12. The terminal according to claim 11, wherein each message object comprises a message icon of a message template.

13. The terminal according to claim 12, wherein the fifth input comprises: an input for moving a message icon of a target message template to the target contact sub-display area.

14. The terminal according to claim 8, wherein the computer program, when executed by the processor, causes the terminal to further perform:
receiving a seventh input performed by a user for a target message object in the N message objects;
displaying a message content of the target message template indicated by the target message object in the message input area in response to the seventh input;
receiving an eighth input performed by a user for editing the message content of the target message template; and
updating the message content of the target message template into the content edited by the eighth input in response to the eighth input.

15. The non-transitory computer-readable storage medium according to claim 14, wherein the computer program, when executed by the processor, causes the terminal to perform:
receiving a third input performed by a user; and
in response to the third input, sending the message contents of the N message templates, and displaying a progress bar in each sub-display area which displays message content; wherein
the progress bar is configured to indicate the sending progress of the message content in the corresponding sub-display area.

16. The non-transitory computer-readable storage medium according to claim 14, wherein the computer program, when executed by the processor, causes the terminal to perform:
receiving a fourth input performed by a user in a contact display area, and
displaying a contact selected by the fourth input in a target contact sub-display area in the contact display area in response to the fourth input, the contact display area displaying at least one contact sub-display area; and
the computer program, when executed by the processor, causes the terminal to perform:
receiving a fifth input performed by a user for associating the target contact sub-display area with a target message object, and
sending a message content indicated by the target message object to a contact displayed in the target contact sub-display area in response to the fifth input.

17. The non-transitory computer-readable storage medium according to claim 16, wherein each message object comprises a message icon of a message template.

18. The non-transitory computer-readable storage medium according to claim 17, wherein the fifth input comprises: an input for moving a message icon of a target message template to the target contact sub-display area.

19. The non-transitory computer-readable storage medium according to claim 14, wherein the computer program, when executed by a processor of a terminal, causes the terminal to further perform:
receiving a seventh input performed by a user for a target message object in the N message objects;
displaying a message content of the target message template indicated by the target message object in the message input area in response to the seventh input;
receiving an eighth input performed by a user for editing the message content of the target message template; and
updating the message content of the target message template into the content edited by the eighth input in response to the eighth input.

20. A non-transitory computer-readable storage medium, storing a computer program, wherein the computer program, when executed by a processor of a terminal, causes the terminal to perform:
receiving N message inputs that is performed in a message input area by a user; wherein N is a integer greater than 1;
displaying N message objects in a message template display area in response to the N message inputs, wherein the N message objects are used to indicate message contents of N message templates edited by the N message inputs; and
sending the message contents indicated by the N message objects to a target contact; wherein
the message template display area comprises at least one sub-display area, each sub-display area comprises one message object, and each message object is used to display the message content of one of the N message templates respectively; wherein
the computer program, when executed by the processor, causes the terminal to further perform:
in a case that an i-th message input is received, displaying an i-th message template by the i-th message input in the message input area, and displaying an i-th target identifier, to display the N message templates and N target identifiers; the i-th target identifier associating with the i-th message template, the i-th message input being any one of the N message inputs, and the i being a positive integer less than or equal to N;
receiving a first for associating the i-th target identifier with a first sub-display area; and
displaying message content of the i-th message template in the first sub-display area in response to the first input.

* * * * *